May 31, 1949.  W. F. HILTNER  2,471,686
CELESTIAL NAVIGATION INSTRUMENT
Filed Sept. 24, 1945  3 Sheets-Sheet 2

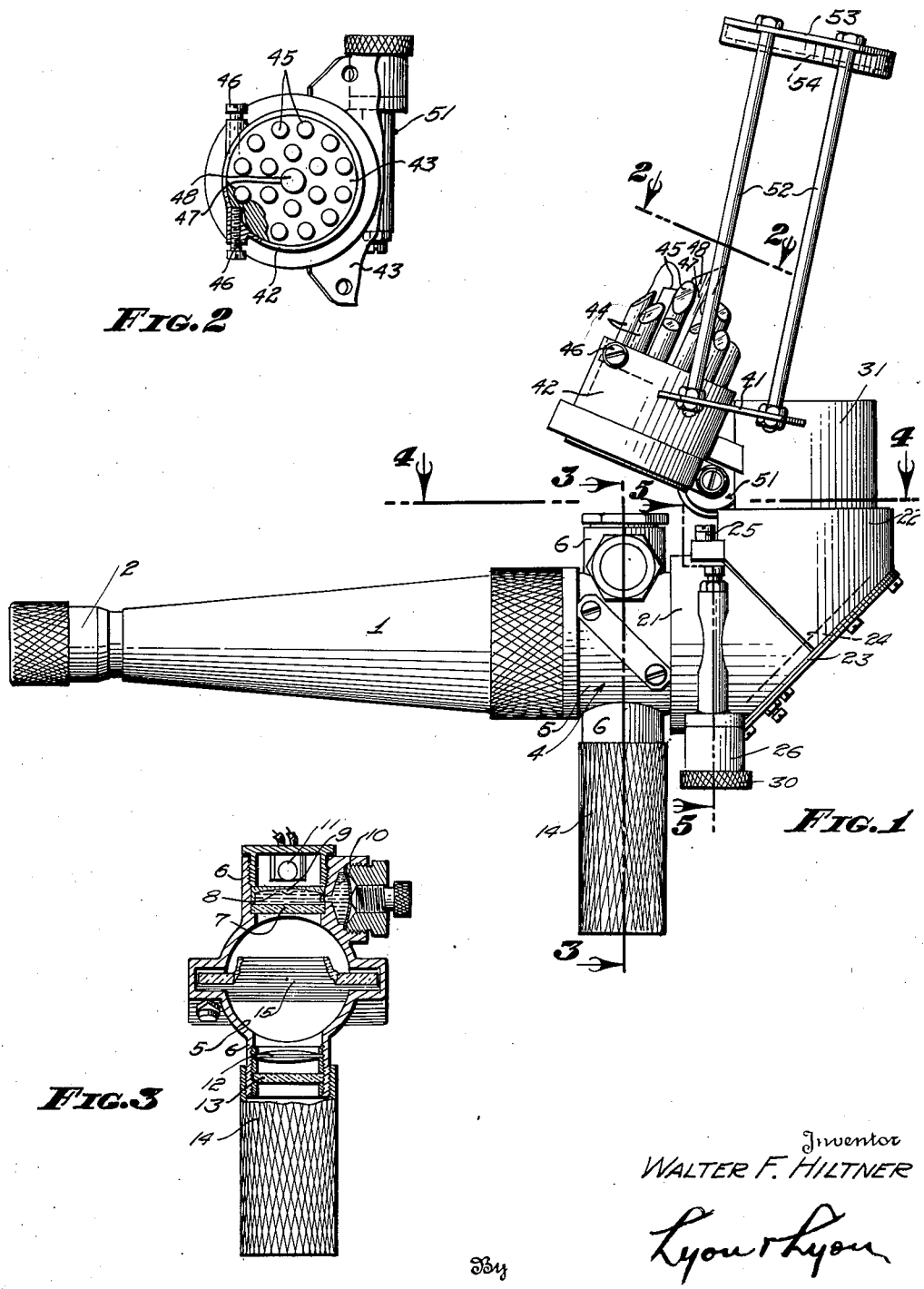

Inventor
WALTER F. HILTNER
By Lyon & Lyon
Attorneys

May 31, 1949.  W. F. HILTNER  2,471,686
CELESTIAL NAVIGATION INSTRUMENT
Filed Sept. 24, 1945   3 Sheets-Sheet 3
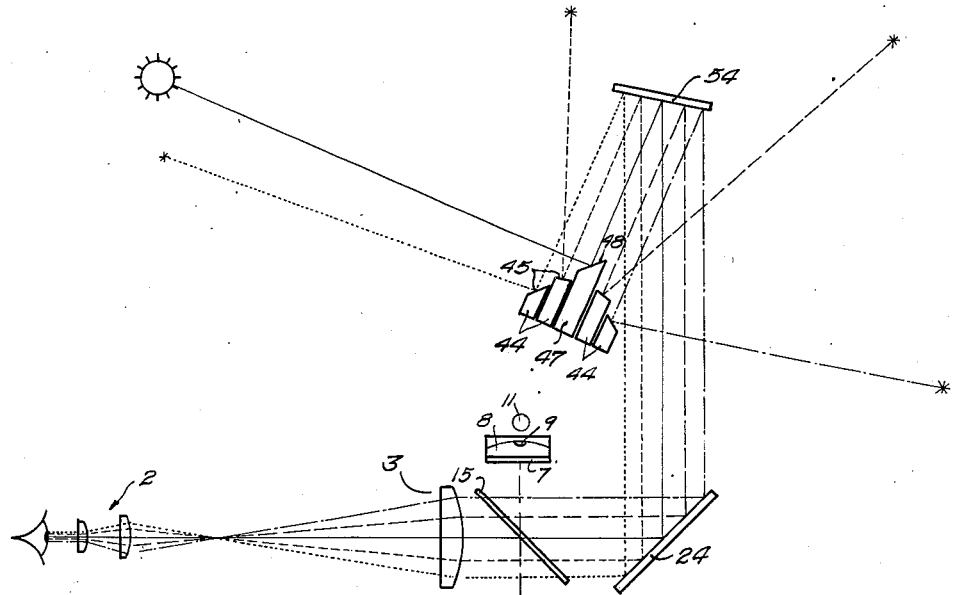
FIG. 6
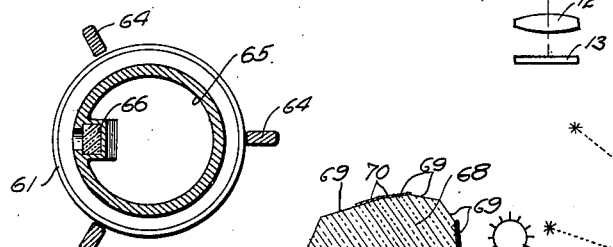
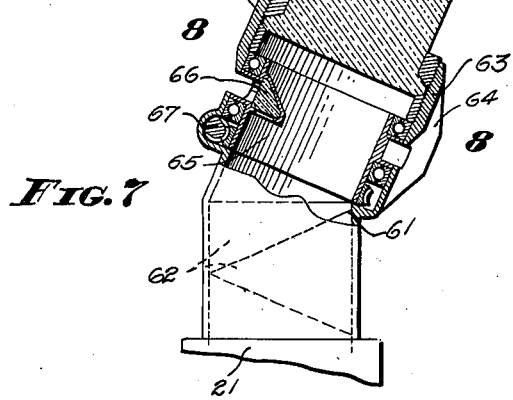
FIG. 8
FIG. 7
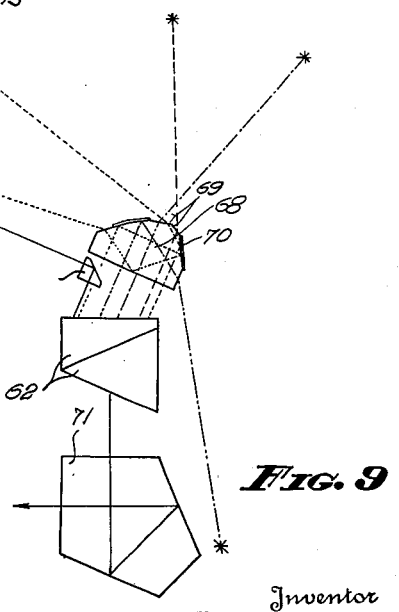
FIG. 9
Inventor
WALTER F. HILTNER
By Lyon & Lyon
Attorneys Patented May 31, 1949

2,471,686

UNITED STATES PATENT OFFICE 2,471,686

CELESTIAL NAVIGATION INSTRUMENT

Walter F. Hiltner, Pasadena, Calif.

Application September 24, 1945, Serial No. 618,232

4 Claims. (Cl. 88—2.7)

Fundamentally, the problem of the navigation from the stars is that of correlating the horizon coordinate system with the celestial coordinate system. My celestial navigation instrument is designed to establish the orientation of the celestial coordinate system and the origin for the horizon system and to measure the angles between them to read directly the terrestrial latitude and longitude of the observer.

For spherical coordinates only two reference planes are necessary. In the celestial sphere, these are determined by the polar axis and the direction of the vernal equinox; in the ecliptic system by the pole of the ecliptic and the vernal equinox. In the terrestrial system, these are the planes of the equator and of the Greenwich meridian. On the other hand each star optically marks a particular axis which is related to the coordinate axes by angular differences; for example, in the celestial sphere the right ascension and declination of the stars.

This may be further explained by consideration of the conventional equatorially mounted telescope where by rotation around the polar axis following a star at a given declination, one can keep track of the passage of time with the rotation of the earth. Suppose the equatorial mounting, with the declination clamped, were reversed and the axis of rotation provided about the line to the star. At some point in the rotation of the system about the star axis, the polar axis would be parallel to the earth axis. One star restricts the rotation to a single axis but does not uniquely determine the orientation of the polar axis. Of course, the same is true of any individual star, however, two stars taken together would limit the direction of the polar axis to only two possible positions, one of which is correct and the other completely wild. These separate solutions correspond to the two points of intersection of circles of position in the conventional navigation technique. The use of three stars will, however, uniquely determine the direction of the polar axis without any possibility of error.

My celestial navigation instrument makes use of the fact that three stars will uniquely determine the direction of the polar axis. In addition, use is made of the fact that a number of bright stars, for instance, eighteen may be so selected that at least five or six of them will be visible above the horizon (preferably above 30 degrees from the horizon to minimize refraction errors) regardless of the position on the earth's surface or the time of night the observation is made.

Therefore, among the objects of my invention are:

First, to provide a navigation instrument which incorporates a novel multiple reflector system capable of directing the images of the usable stars forming a part of a selected group into a parallel bundle along the polar axis, the reflector system being so arranged that the right ascension and declination for each star is incorporated in the orientation of the various reflector elements comprising the multiple reflector systems, and thus by use of the selected stars in their known positions the navigation instrument determines the orientation of the celestial coordinate system, that is the direction of the pole and vernal equinox, by the orientation of the axes in the instrument from which the angles to the various reflector elements were originally laid off.

Second, to provide a celestial navigation instrument which by means of a clock drive relates the celestial coordinate system to the terrestrial system, and by means of micrometer adjustments coordinates of the zenith are measured in the terrestrial system.

Third, to provide a celestial navigation instrument which incorporates in its reflector system a reflecting element for observing the sun, such reflecting element being adjustable relative to the other reflecting elements of the reflecting system by rotation about the ecliptic axis to orient the sun reflector element for any particular time of the year.

Fourth, to provide a celestial navigation instrument which is self-contained, light in weight and capable of rapid adjustment while held by the observer, much in the manner of a sextant, and which, upon adjustment, supplies the readings directly in longitude and latitude.

Fifth, to provide a celestial navigation instrument wherein correction for precessional change of right ascension and declination of all stars is conveniently provided.

With the above and other objects in view as may appear hereinafter, reference is directed to the accompanying drawings in which:

Fig. 1 is a side elevational view of the celestial navigation instrument; for convenience in illustration the position shown represents the setting of the instrument if the observation were made near the North Pole on or about June 21.

Fig. 2 is a fragmentary sectional view through 2—2 of Fig. 1 showing in plan the arrangement of reflector elements comprising the reflector system.

Fig. 3 is a transverse sectional view through 3—3 of Fig. 1 showing the artificial horizon.

Fig. 6 is a diagrammatical view of the optical system employed in the form of my instrument depicted in Figures 1 through 5.

Fig. 7 is a fragmentary sectional view of a modified form of my celestial navigation instrument wherein a prism reflector system is employed in place of a mirror reflector system.

Fig. 8 is a transverse sectional view through 8—8 of Fig. 7.

Fig. 9 is a fragmentary diagrammatical view of the optical system employed in the modified form of my instrument shown in Figures 7 and 8.

Figure 4:
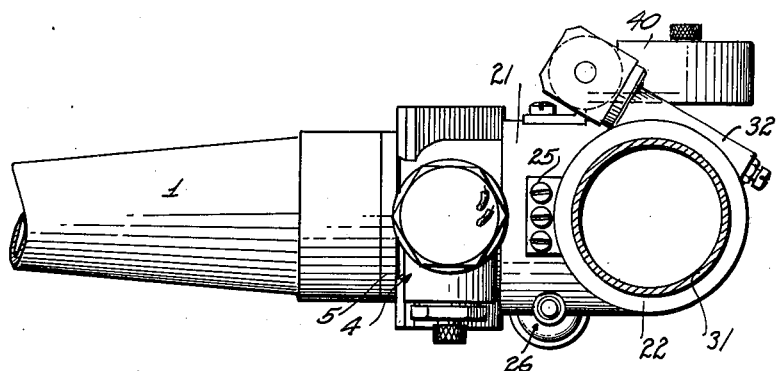
Fig. 4 is a fragmentary sectional view through 4—4 of Fig. 1 showing in particular the time and longitude drive mechanisms.

My celestial navigation instrument includes a telescope structure 1 having an eye piece 2 and a suitable lens 3. The telescope structure is attached to an artificial horizon unit 4 having a coaxial horizontal axis tube 5. The horizontal axis tube 5 is intersected by a divided transverse tube 6 projecting upwardly and downwardly therefrom. The upper portion of the transverse tube 6 contains a reticule 7 and a level element 8 having a bubble 9 therein adapted to coincide with the reticule when the axis of the transverse tube 6 is vertical, thus establishing a vertical axis in the instrument.

A suitable pressure regulating means 10 communicates with the interior of the level element so as to permit use of the instrument at different altitudes. Within the upper portion of the transverse tube 6 above the reticule is a light source 11. In the lower portion of the transverse tube 6 is a lens 12 and mirror 13. The lower portion of the transverse tube 6 may include a handle 14 which may be adapted to receive a battery to supply current for the light source 11. Mounted in the horizontal axis tube 5 and having a central point registering with the axis of the transverse tube 6 is a transparent reflector plate 15, so that the centering of the bubble may be observed thru the telescope. Plate 15 is inclined at 45° so that the telescope axis is perpendicular to the vertical axis and therefore always horizontal when the bubble is centered.

A pair of right angularly disposed sleeves 21 and 22 are provided. The adjacent sides of the sleeves are beveled at approximately 45° along their confronting margins and their remote sides are likewise beveled to define a common plane at a 45° angle to their respective axes. The 45° common plane of the sleeves so defined is covered by a plate 23 on which is mounted a reflector 24. The angular relationship of the sleeves 21 and 22 are adjusted to exactly 90° by screws 25 and by allowing slight bending of the plate 23. The adjusting screws are located in the inside corner of the elbow formed by the two sleeves.

The sleeve 21 telescopes over the horizontal axis tube 5 and is adapted to rotate thereon through 360°. This movement is accomplished by a latitude micrometer drive 26 which includes a worm gear 27 mounted on the tube 5, a worm 28 mounted in a housing disposed tangentially on the sleeve 21, a counter element 29 and a setting knob 30 disposed at an extremity of the worm shaft. The counter element 29 is designed to read in degrees and minutes and indicate the latitude from 90° N. to 0° to 90° S. by measuring the inclination of the polar axis relative to the vertical axis, both axes defined optically in the instrument. Since the horizontal axis is perpendicular to the polar axis it must be directed due east (or west) when the polar axis is directed toward the pole.

Figure 5:
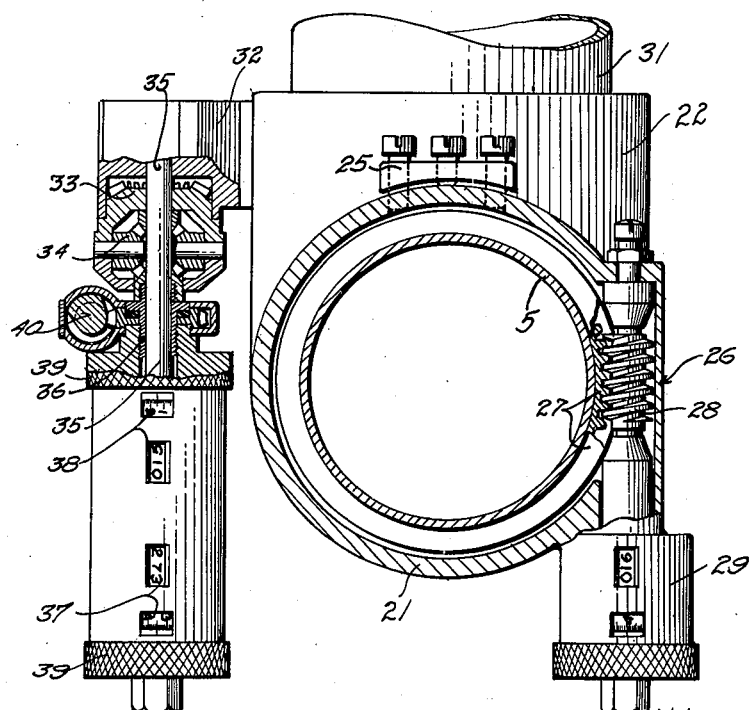
Fig. 5 is a transverse sectional view through 5—5 of Fig. 1 also showing the time and longitude drive means.

The tube 22 telescopes similarly over a polar axis tube 31 and is connected thereto by a longitude micrometer drive 32, having a worm gear, worm, and worm shaft similar to that of the latitude micrometer drive 26. The worm shaft of the longitude micrometer drive, however, is connected by bevel gears 33 to a differential unit 34, shown best in Figure 5. The differential unit is driven by a longitude shaft 35 and a sidereal time shaft 36 in the form of a sleeve fitting over the longitude shaft 35. The longitude shaft drives a counter element 37, whereas the time shaft 36 drives the counter element 38. The shafts 35 and 36 are also provided with knurled setting wheels 39. A clock drive 40 is connected to the time shaft 36.

The longitude counter element and the time counter element 37 and 38 are both designed to indicate 360° of rotation, around the polar axis, measuring the position of the whole reflector assembly whose description follows relative to the horizontal-east west axis.

Mounted at an angle of approximately 23½ degrees at one side of the polar axis tube 31 by means of a bracket plate 41 is an ecliptic axis tube 42. Suitable adjusting screws are provided to permit accurate adjustment of the axis of the tube 42 relative to the axis of the tube 31, it being noted that the included angle between the ecliptic axis and the polar axis is 23°27'8.25". Set in the upper end of the ecliptic axis tube 42 as viewed in Figure 1 is a reflector mounting plate 43 having concentric rings of holes in which are mounted rods 44. The upper ends of the rods 44 are beveled at various predetermined angles and provided with reflecting surfaces to form star image reflectors 45. The reflector plate 43 with rods 44 and reflecting surfaces 45 constitute a fixed and rigid unit in the completed instrument. However, the setting of the reflector surfaces 45 to the required angles is a most delicate and precise optical adjustment since the light rays from all the selected sources must be deflected into a parallel bundle along the optical axis, which in the embodiment shown in Figure 1 is essentially parallel to the ecliptic axis tube 42, if the images of the light sources are to be observed as coincident in the telescope. Two simultaneous angles must be established for each reflector one of which may be indexed about the axis of each rod measured from some selected index axis and the other angle set off as the bevel angle. Technical details for orienting these reflectors are in no wise essential to the function of the reflector system which may be constructed in various ways to provide the required angular relations, as shown below.

When a particular orientation of the optical and index axis is chosen, as for example toward the pole of the ecliptic, and vernal equinox the normal to each reflecting surface will lie in the plane determined by the optical axis and the corresponding entering light ray. The direction of this plane gives the index angle. Further, the normal must bisect the angle between the optical axis and the entering ray, thus giving the bevel angle. These required index and bevel angles for each reflector may be incorporated in reflector assembly in many ways including the two following.

The first method requires calculation by ordinary spherical trigonometry of the two angles from the index axis and optical axis to the source of light. These angles may be set off by whatever method is convenient, such as adjusting on a spherical base of each rod, or by filing and polishing the reflector surfaces until the desired angles are obtained. To check correctness of angles requires an optical bench, two perpendicular graduated circles such as laboratory spectroscope stands, care and patience.

The second method is especially adapted to settings for the stars. The reflector assembly is fastened to the conventional equatorial telescope mounting, its optical and index axes directed toward the selected celestial axes using the graduated circles of the mounting, the sidereal clock drive of the telescope mount is engaged to maintain the selected orientation relative to the stars while the image of each successive star is adjusted to appear coincident with that of the others at the center of the field of view in the telescope. Attention is directed to the fact that the sidereal clock drive 40 which is a part of the device will itself provide this motion if the polar axis is directed toward the celestial pole. The necessary initial settings on latitude 29, longitude 37 and time 38 counters can be determined from the known terrestrial position of calibration station.

Attention is further called to the requirement that each reflecting surface 45 must be placed so that no other rod 44 or other part of the device such as the posts 52 or the reflector support 53 will cut off the entering light to that reflector 45. The arrangement and choice of which reflector goes with what star is thus determined in part by trial.

Further details of adjustment would be clear to those skilled in the construction of optical instruments. The reflector mounting plate 43 may be rotated in the ecliptic axis tube 42 by means of adjustment screws 46 for the purpose of correcting the orientation of all the reflectors simultaneously for precession. Inasmuch as the annual amount of precession is only 50″.26 per year, the amount of adjustment is relatively minor.

The mounting plate 43 has a central opening through which extends a shaft 47, the upper end of which is beveled at 45° to form a sun reflector 48. The shaft 47 is driven by a worm gear and worm, as in the case of the latitude micrometer drive, forming an acliptic axis micrometer drive 51. As is the case with the other micrometer drives a counter element and setting knob is provided. The counter element in this case reads in degrees and minutes the celestial longitude of the sun in the ecliptic coordinate system. The day of the year on which the observation is made may be translated by means of appropriate charts into the desired reading on the counter of the drive 51.

In particular for the instant of vernal equinox, celestial longitude of the sun is zero, which reading would be set on counter 51. The sun reflector 48 shown in Figures 1 and 6 would then be turned directly toward the reader, perpendicular to the paper but specifically perpendicular to the polar and ecliptic axes.

The bracket plate 41 supports four uprights or posts 52, the upper ends of which carry a reflector support 53 on the under side of which, as viewed in Figure 1, is a reflector 54. A line normal to the plane of the reflector 54 bisects the angle between the tubes 42 and 31 so that the images reflected by the various star image reflectors 45 or the sun reflector 48 are reflected parallel with the axis of the polar axis tube 31, and upon further reflection by the reflector 24, through the horizontal axis tube and into the telescope structure 1.

With reference particularly to Figure 6, it will be seen that the star image reflectors 45 are beveled at various angles and their planes oriented in different directions. It is possible to provide any number of star image reflectors limited only by the size of the instrument and have them so positioned that when the instrument is properly adjusted, the image from its particular star will be reflected into and through the instrument to the eye piece parallel with the rays from other selected stars. Of the myriads of stars it is convenient to select 18 easily identified bright stars so scattered that regardless of the position on earth from which it is desired to make observations, and regardless of the time of night (or even day time in the case of stratospheric navigation) at least three stars will be above the horizon, in fact an average of 9 stars will be above the horizon. In order to avoid atmospheric refraction errors only those stars 30° above the horizon need be considered. Furthermore, the choice of stars may be such that no appreciable interference is produced by stars not included in the selected group.

By way of example, but not of limitation, the following stars may be used: Gamma Cassiopia, Aldebaran, Rigel, Capella, Betelguex, Sirius, Procyon, Pollux, Regulus, Dubhe, Spica, Alkaid, Arcturus, Antares, Vega, Altair, Deneb, and Fomalhout.

For purposes of illustration it should be noted that in the position shown in Figures 1 and 6 the vertical axis as defined by the artificial horizon unit and the polar axis as defined by the polar axis tube 31 are nearly parallel, and the polar axis tube is directed upwardly indicating the instrument is set for an observation near the North Pole about June 21. Operation of my celestial navigation instrument is as follows:

1. The clock drive is started and Greenwich sidereal time is set on the time counter, 38.
2. Estimated latitude and longitude if available may be set on counter 29 and 37 respectively.
3. The telescope 1 is directed more or less toward the east.
4. The artificial horizon 4 is held more or less vertical, the multiple star reflecting assembly will then be approximately correctly oriented in space. The precision of the orientation will depend on the combined precision of steps 2, 3, and 4.
5. The exact orientation of the multiple star reflecting assembly is obtained by observing through the telescope the coincidence of all the available star images. This coincidence perforce appears exactly in the center of the field of view. Once obtained it uniquely determines the orientation of the reflecting assembly relative to the stars and to the celestial coordinate system. To find this orientation it is required that each star reflector should be directed toward its corresponding star. This may be done by trial, rotating, swinging or rocking the whole instrument in its three degrees of freedom. When any one correct star is observed in the field of the telescope all the others will appear as the instrument is further rotated (about the axis toward the given star) keeping this first star in view. If the other stars do not appear, the first star is not correctly reflected and should be abandoned. The actual relative positions of stars in the heavens happen to absolutely preclude the possibility of any false coincidence.

6. The orientation of step 5 is maintained as the latitude 30 and longitude 39 dials are adjusted to bring the bubble also into the center of the field of view. Size of bubble and its illumination may be adjusted by the means described elsewhere.

7. Position is read off latitude 29 and longitude 37 counters.

8. If position does not change, leveling the instrument by observing the bubble in the middle of the field as indicated by the reticule and directing the telescope axis east will bring all the stars into mutual coincidence again and with bubble. Note that the clock drive through the differential gears takes account of the apparent motion of the whole of the heavens without need to adjust longitude dial.

9. If position is changing, continuous adjustment of the dials will be necessary to maintain exact coincidence of bubble with that of stars. However, the field of view through the telescope may be provided large enough to permit any desired small change of position from that set on the instrument and still keep the stars in the field when the bubble is centered.

In the course of routine observations, the presumed position may be set into the instrument first and quickly checked. For very precise use of the instrument in aerial navigation it is desirable to correct the position as obtained by the instrument for the affect of slow continuous turns and for Corielus acceleration. These corrections are tabulated and explained in detail in the Air Almanac.

When the instrument is used in the day time, the ecliptic axis micrometer is adjusted so that the plane of the sun reflector is properly oriented for the day of the year in which the observation is made. In this event the instrument gives readings of latitude and corresponding longitude somewhere along the "line of position" without uniquely determining the position.

Reference is now directed to the structure shown in Figures 7, 8, and 9. Whereas the operation of this instrument is substantially the same as the first described instrument, prisms are employed in place of mirrors or reflectors. The polar axis tube 31 is provided with a curved or angular extension 61, the extremity of which is directed 23½ degrees from the polar axis. Within the extension 61 is secured an achromatic prism 62 designed to bend the light entering along the ecliptic axis 23½ degrees into the polar axis. The extremity of the extension 61 is provided with a mounting ring 63 spaced therefrom by connecting ribs 64. Within the space defined by the mounting ring 63 and the extremity of the extension 61 is a sun prism ring 65. The sun prism ring 65 supports preferably at one side a sun prism 66 adapted to deflect the sun's rays entering radially into the space between the extension 61 and the mounting ring 63 so that they pass along the ecliptic axis.

The sun prism ring is provided with an ecliptic axis micrometer drive 67 designed to adjust the position of the prism for the day in which the observation is made.

A star prism 68 is secured in the mounting ring 63. The star prism is provided with a plurality of facets 69, the planes of which are designed to deflect the images of selected stars to be parallel to the ecliptic axis. As shown best in the diagrammatical view Fig. 9 the manner in which the images are reflected parallel to the ecliptic axis may vary considerably depending upon the position of the star. For instance, one facet may be sufficient to direct the image of the star into the ecliptic axis. For other stars several reflections and consequently several facets may be necessary to deflect the image into the ecliptic axis. In some instances the interior surface of the prism is sufficient, in other instances the surface of selected facets need be silvered as indicated by 70. While the structure shown in Figures 7, 8, and 9 may employ the reflector or mirror 24 of the first described structure, it is obvious that a right angular reflecting prism 71 may be employed.

Many other embodiments of the invention may be resorted to without departing from the spirit of the invention.

I claim:

1. A celestial navigation instrument comprising: a group of at least three light deflecting elements secured to a mount element in such a predetermined relation to each other that upon orientation of the group and mount into a predetermined relation to all the stars, light from every particular selected star corresponding to each light deflecting element is directed along a single axis, the ecliptic axis in space; a carrier for the mount providing rotational adjustment between carrier and mount about said axis; an additional light deflector for the sun similar to star light deflectors mounted on the carrier and provided with independent rotational adjustment between this last reflector and carrier about said axis; a light deflector supported on said carrier so oriented with respect to mount and carrier that all the light rays from the first axis are directed along a second axis, where the included angle between the said first and second axes is substantially 23½°, and the plane determined by these two axes is normal to the direction to the vernal equinox in space; an elbow supporting said carrier for rotation about said second axis; a light deflector secured to said elbow so oriented with respect to the elbow that the light beam formed along the second axis is directed along a third axis perpendicular to the second; a telescope supporting the elbow for rotation about the third axis, and having its optical axis coincident with this third axis; a zenith indicator attached to the telescope with its zenith axis perpendicular to the third axis; and means for indicating the angular position of the telescope relative to the elbow, of the elbow relative to the carrier, of the carrier relative to the mount, and of the carrier relative to the sun light deflector.

2. A celestial navigation instrument comprising: a group of at least three light deflecting elements secured to a mount element in such a predetermined relation to each other that upon orientation of the group and mount into a predetermined relation to all the stars, light from every particular selected star corresponding to each light deflecting element is directed along a single axis; a carrier for the mount providing rotational adjustment between carrier and mount about said axis; a light deflector supported on said carrier so oriented with respect to group, mount and carrier that all the light rays from the first axis are directed along a second axis, the polar axis in space, where the included angle between said first and second axes is substantially 23½°, and the plane determined by these two axes is normal to the direction of the vernal equinox in space; an elbow supporting said carrier for rotation about said second axis; a light deflector secured to said elbow so oriented with respect to the elbow that the light beam along the said second axis is directed along a third axis perpendicular to the second; a telescope supporting the elbow for rotation about the third axis, and having its optical axis coincident with this third axis; a zenith indicator attached to the telescope with its zenith axis perpendicular to the third axis; and means for indicating the angular position of the telescope relative to the elbow, of the elbow relative to the carrier, and of the carrier relative to mount.

3. A celestial navigation instrument comprising: a group of at least three light deflecting elements secured to a mount element in such a predetermined relation to each other that upon orientation of the group and mount into a predetermined relation to all the stars, light from every particular selected star corresponding to each light deflecting element is directed along a single axis, the polar axis in space; an elbow supporting said mount for rotation about this first axis; a light deflector secured to said elbow so oriented with respect to the elbow that the light beam formed along this first axis is directed along a second axis perpendicular to the first; a telescope supporting the elbow for rotation about this second axis, and having its optical axis coincident with the second axis; a zenith indicator attached to the telescope with its zenith axis perpendicular to the second axis; and means for indicating the angular position of the telescope relative to the elbow, and of the elbow relative to the mount.

4. A celestial navigational instrument comprising a mount element, a group of at least three light receiving elements carried by said mount element in such a predetermined relationship to each other that upon orientation of such group and said mount into a predetermined relation to all the stars, light from every particular selected star corresponding to each of said light receiving elements is directed by its respective element in a predetermined direction relative to a single preselected axis, means supporting said mount for rotation about said axis, means supporting said first supporting means for rotation about a second axis perpendicular to said first axis, a zenith indicator secured to said second supporting means with its zenith axis perpendicular to said second axis, and means operable to indicate the angular position of said mount about said first axis relative to said first supporting means and the angular position of said first supporting means about said second axis relative to said second supporting means.

WALTER F. HILTNER.

REFERENCES CITED

The following references are of record in the file of this patent:

UNITED STATES PATENTS

| Number | Name | Date |
|---|---|---|
| 2,039,878 | Boykow | May 5, 1936 |
| 2,316,466 | Storer | Apr. 13, 1943 |
| 2,337,587 | Brocky | Dec. 28, 1943 |

FOREIGN PATENTS

| Number | Country | Date |
|---|---|---|
| 105,371 | Great Britain | Apr. 5, 1917 |
| 567,379 | France | Dec. 5, 1923 |